United States Patent [19]

Schiffleger

[11] Patent Number: 5,371,879
[45] Date of Patent: Dec. 6, 1994

[54] APPARATUS AND METHOD FOR TESTING OF NEW OPERATING SYSTEMS THROUGH PRIVILEDGED INSTRUCTION TRAPPING

[75] Inventor: Alan J. Schiffleger, Chippewa Falls, Wis.

[73] Assignee: Cray Research, Inc., Eagan, Minn.

[21] Appl. No.: 233,222

[22] Filed: Apr. 26, 1994

Related U.S. Application Data

[63] Continuation of Ser. No. 678,127, Apr. 1, 1991, abandoned.

[51] Int. Cl.$^5$ .............................................. G06F 9/455
[52] U.S. Cl. ........................... 395/500; 364/DIG. 1; 364/280; 364/280.8; 364/280.9; 364/282; 364/975.4; 364/976; 364/976.1; 364/976.2
[58] Field of Search ................ 364/DIG. 1 MS File, 364/DIG. 2 MS File; 395/375, 500, 700, 800; 371/19

[56] References Cited

U.S. PATENT DOCUMENTS

| | | | |
|---|---|---|---|
| 4,128,880 | 12/1978 | Cray, Jr. | 395/DIG. 1 |
| 4,253,145 | 2/1981 | Goldberg | 395/500 |
| 4,636,942 | 1/1987 | Chen et al. | 395/DIG. 1 |
| 4,661,900 | 4/1987 | Chen et al. | 395/DIG. 1 |
| 4,745,545 | 5/1988 | Schiffleger | 395/DIG. 1 |
| 4,812,967 | 3/1989 | Hirosawa et al. | 395/DIG. 1 |
| 5,038,281 | 8/1991 | Peters | 395/DIG. 1 |

FOREIGN PATENT DOCUMENTS

A0301707 2/1989 European Pat. Off. .

OTHER PUBLICATIONS

MC68020. 32-Bit Microprocessor User's Manual, sec. Edition 1985, Prentice-Hall, Inc., Englewood Cliffs, N.J., US; see pp. 1-8 and 12.

Primary Examiner—Robert B. Harrell
Attorney, Agent, or Firm—Schwegman, Lundberg & Woessner

[57] ABSTRACT

A method of implementing a privileged instruction that enables the development of new operating systems in user mode. The instruction decode logic includes a maskable interrupt generator that interrupts the processor during the processing of privileged instructions in user mode. An exception handler processes the privileged instruction interrupt and performs a function similar to the execution of the privileged instruction in privileged instruction mode. The combination of the privileged instruction interrupt and the post-interrupt exception handling enables the operating system developer to test new operating systems by laying them over the current operating system.

4 Claims, 6 Drawing Sheets

| | 63 62 61 60 59 58 57 56 55 54 53 52 51 50 49 48 47 46 45 44 43 42 41 40 39 38 37 36 35 34 33 32 | 29 28 27 26 25 24 23 22 21 20 19 18 17 16 15 14 13 12 11 10 09 08 07 06 05 04 03 02 01 00 −1 −2 |
|---|---|---|
| 0 | PROGRAM ADDRESS REGISTER | |
| 1 | INSTRUCTION BASE ADDRESS | 31 30 29 28 27 26 25 24 23 22 21 20 19 18 17 16 15 14 13 12 11 10 |
| 2 | INSTRUCTION LIMIT ADDRESS | 31 30 29 28 27 26 25 24 23 22 21 20 19 18 17 16 15 14 13 12 11 10 |
| 3 | DATA BASE ADDRESS | 31 30 29 28 27 26 25 24 23 22 21 20 19 18 17 16 15 14 13 12 11 10 |
| 4 | DATA LIMIT ADDRESS | 31 30 29 28 27 26 25 24 23 22 21 20 19 18 17 16 15 14 13 12 11 10 |
| 5 | INTERRUPT MODES<br>I F I I I I F<br>R U O P E B C M R I P D M N<br>P M P R R X P M C T P O C L I X | STATUS / MODES<br>V F W P C E B M<br>N P S S 9 S D M<br>U S O L M |
| 6 | INTERRUPT FLAGS<br>R M F O P E B M R I P D M N<br>P P P R R E P E C T C O C L I E<br>U E U E E X I C U I P I X | |
| 7 | SLOT NUMBER<br>X X X 03 02 01 00 | CLUSTER NUMBER<br>X X X 04 03 02 01 00 | EXCHANGE ADDRESS<br>11 10 09 08 07 06 05 04 | VECTOR LENGTH<br>07 06 05 04 03 02 01 00 |

(arrow from row 7, bit 31 → to A0...A7 block at 0)

| 10...17 | A0 ... A7 |
| | S0 ... S7 |

APPARATUS AND METHOD FOR TESTING OF NEW OPERATING SYSTEMS THROUGH PRIVILEDGED INSTRUCTION TRAPPING

This is a continuation of application Ser. No. 07/678,127, filed Apr. 1, 1991, now abandoned.

BACKGROUND OF THE INVENTION

1. Field of the Invention

The present invention pertains to the field of high speed digital data processors and more particularly, to a method of instruction implementation useful for operating system development.

2. Background Information

An operating system is a collection of programs that controls the execution of other programs in a computer system. Operating system programs reside in processor memory where they coordinate, among other things, such tasks as I/O operations and the execution of background tasks and application programs on the system. Operating systems free the application programmer from hardware anomalies by, in effect, hiding the hardware behind a well-behaved and documented interface. And they improve the efficiency of execution of a computer system by managing memory and controlling when a program can execute. As such the performance of the operating system is critical for achieving optimal system performance.

Since operating systems perform these critical functions of program and memory control, processors have evolved with powerful privileged instructions which can be used to affect the execution of the machine. Typical instructions are those used for I/O control, interrupt handling and masking and program control. Privileged instructions are typically constrained to execute in a privileged instruction mode accessible only to operating systems. This is done to protect systems from catastrophic failure due to incorrectly written application programs.

In the Cray Y-MP manufactured by the Assignee of the present invention, there are two modes of instruction execution: monitor mode and user mode. Privileged instructions run only in monitor mode. If a privileged instruction issues while the processor is not in monitor mode, it is treated as a no-operation instruction.

The operating system of the typical Cray Y-MP computer system manages execution of application programs through the use of exchange sequences, fetch sequences and issue sequences. Exchange sequences occur at initialization or when a program is started. An exchange sequence moves sets of basic parameters called exchange packages. Parameters currently residing in the operating registers of a processor are moved to memory and, simultaneously, different parameters are loaded to the operating registers.

The Cray Y-MP is a multitasking system. That is, it supports the execution of more than one program in a processor at a time. It also is a multiprocessing system. Therefore a program begun in one processor may be swapped to memory and continued later in a different processor. To facilitate this, each exchange package contains information that is used to coordinate the transition from one program to another. Exchange package contents describe the state of the processor at the time that a program is started or swapped to memory (exchanged). This information includes the contents of control registers, pending interrupts, current vector length and memory addressing constraints. It also includes the logical address of the processor that performed the exchange sequence. These are the basic parameters necessary to provide continuity when a program stops and restarts.

The development of an operating system is a complicated and time-consuming process which typically revolves around many iterations of software releases. The difficulty of the task is compounded by the need to test the system in privileged instruction mode in order to ascertain the function of the privileged instructions. Since an operating system running in privileged instruction mode is free of many of the constraints invoked to protect other software, operating systems must be debugged separate from application code. Then the operating system must be placed into a realistic environment in which it can be tested performing its control tasks.

This problem is compounded in the case of new hardware platforms. In the development of new operating systems on new hardware platforms, there is a great deal of uncertainty as to whether the hardware, operating system or application code is the source of a problem.

In prior art systems, special instructions have been provided that ease the task of debugging software. In microprocessors such as the 68000 family by Motorola, a facility is included for "tracing" following each instruction. When "tracing" is enabled, an exception is forced after each instruction is executed. Thus a debugging program can monitor the execution of the program under test.

The 68000 family also features trap instructions. The TRAP instruction always forces an exception and is useful for implementing system calls for user programs. Other instructions can force trap exceptions on abnormal conditions encountered during instruction execution (such as a division operation with a divisor of zero).

Although instructions like a TRAP instruction and facilities like trace make debugging of application code much easier, they are less useful in the development of operating systems. TRAP instructions can be used to detect error conditions or to cause an unconditional swap to the operating system. But they are of limited use in program code executing in privileged mode. Facilities such as trace create a large amount of overhead that can lead to uncharacteristic code execution and may cause one to miss errors in code interactions. This is especially critical in areas of system control such as I/O.

It is clear that there is a need for a method of developing operating system code that will promote rapid and accurate development of new operating systems. What is needed is a privileged instruction that can be executed to a limited extent in user mode without increasing the danger of system instability.

SUMMARY OF THE INVENTION

The present invention is a method of implementing a privileged instruction that enables the development of new operating systems in user mode. The instruction decode logic includes a maskable interrupt generator that interrupts the processor during the processing of privileged instructions in user mode. An exception handler processes the privileged instruction interrupt and performs a function similar to the execution of the privileged instruction in privileged instruction mode. The combination of the privileged instruction interrupt and the post-interrupt exception handling enables the operating system developer to test new operating systems by laying them over the current operating system.

DETAILED DESCRIPTION OF THE PREFERRED EMBODIMENT

In the following detailed description of the preferred embodiment, references made to the accompanying drawing which form a part thereof, and which is shown by way of illustration a specific embodiment in which the invention may be practiced. It is to be understood that other embodiments may be utilized and structural changes may be made without departing from the scope of the present invention.

Figure 1:
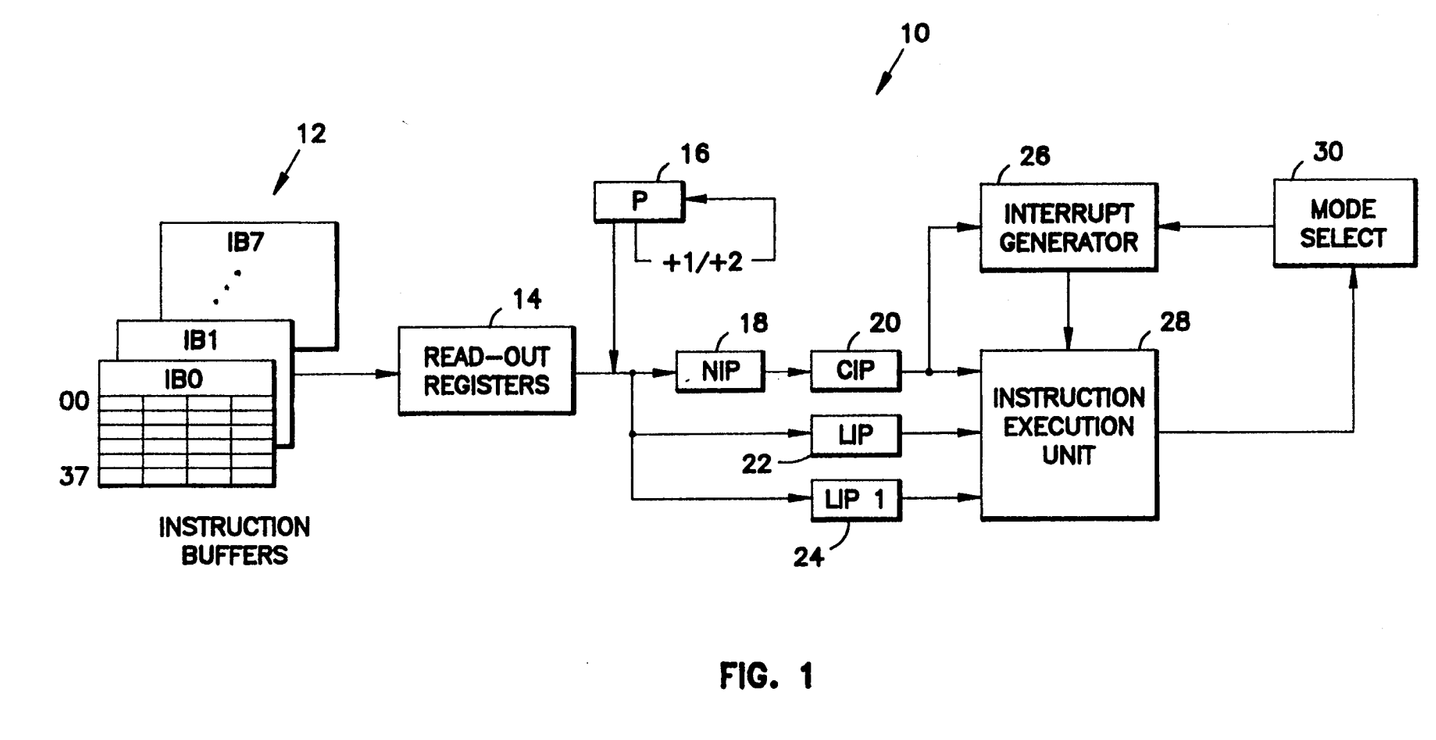
FIG. 1 is a high-level block diagram of a portion of a vector processor with privileged instruction interrupt according to the present invention.

FIG. 1 illustrates a portion of processor 10 with privileged instruction interrupt according to the present invention. Processor 10 includes an instruction execution unit 28 connected to current instruction parcel (CIP) register 20, lower instruction parcel (LIP) register 22, lower instruction parcel 1 (LIP1) register 24, interrupt generator 26 and mode select 30. Current instruction parcel 20 is connected through next instruction parcel (NIP) 18 to two read-out registers 14 which are connected in turn to the eight instruction buffers 12.1 through 12.8. Program address register 16 is connected to read-out registers 14 and instruction buffers 12.1 through 12.8. Program address register 16 provides the address into buffers 12. Even-numbered words are loaded into one of the read-out registers 14, while odd-numbered words are loaded into the other. Instruction buffers 12.1 through 12.8 serve as intermediate storage for instructions fetched from main memory (not shown). They function as an elementary instruction caching function.

In the preferred embodiment, instructions can be one, two or three parcels long. Each parcel is sixteen bits. Next instruction parcel register 18 receives an instruction parcel from one of the read-out registers 14. While the instruction is held in register 18, it is decoded to determine if the instruction is a one, two or three parcel instruction. The parcel is then passed on to current instruction parcel register 20.

Current instruction parcel register 20 receives the parcel from register 18 and holds it until it issues. Issue of an instruction can be held for such things as resolution of an access to a shared register. Once issued it is executed by instruction execution unit 28.

Lower instruction parcel register 22 and lower instruction parcel 1 register 24 are used to hold the second and third parcels of an instruction, respectively, when applicable. The full instruction is then presented to instruction execution unit at instruction issue.

Interrupt generator 26 is used to cause an exception on encountering a privileged instruction while in user mode. In the preferred embodiment, parcels that begin with a binary opcode of 0000001XXXXXXXYYY (where any one of the X is non-zero and Y is don't care) or 0011011YYYYYYYYY (where Y is don't care) will generate a privileged instruction interrupt. Exception handling software in the monitor mode software determines the nature of the interrupt and, on determining it is a privileged instruction interrupt, it mimics the effect of execution of that privileged instruction. This is a powerful tool that permits the testing of new operating system software in the more forgiving environment of user mode.

When the privileged instruction interrupt is enabled, executing a privileged instruction in user mode generates an exchange. The privileged instructions act like an error exit or a normal exit instruction. If a privileged instruction enters NIP (Next Instruction Parcel) register 18, then an interrupt flag is generated which instructs the processor that an exchange must take place.

The interrupt flag will shut down the instruction stream so that no other instructions get into NIP 18 by holding P register 16. The processor then sets up to do an exchange. The privileged instruction that had entered NIP 18 will go into CIP 20 and be executed as a NO-OP because of user mode. Following this, the exchange takes place.

The exchange brings in the operating system. Once the privileged instruction was issued out of CIP 20, the processor set a flag in the exchange package that tells the operating system that a privileged instruction had issued in interrupt mode and that this is why the exchange occurred. In this fashion, when the exchange takes place, P register 16 is pointing at the instruction after the privileged instruction.

The operating system decrements P register 16 in order to find the location of the privileged instruction. It then looks at the instruction, branches to a subroutine written to emulate the instruction and initiates an exchange back to the original calling program. The privileged instruction interrupt can be masked by clearing a bit in one of the operating registers that make up the exchange package. In FIG. 1, mode select 30 is that operating register. Clearing a bit in mode select 30 disables the privileged instruction interrupt. Subsequent privileged instructions are treated like no-operation (NOP) instructions in user mode as in the Y-MP above.

Figure 2:
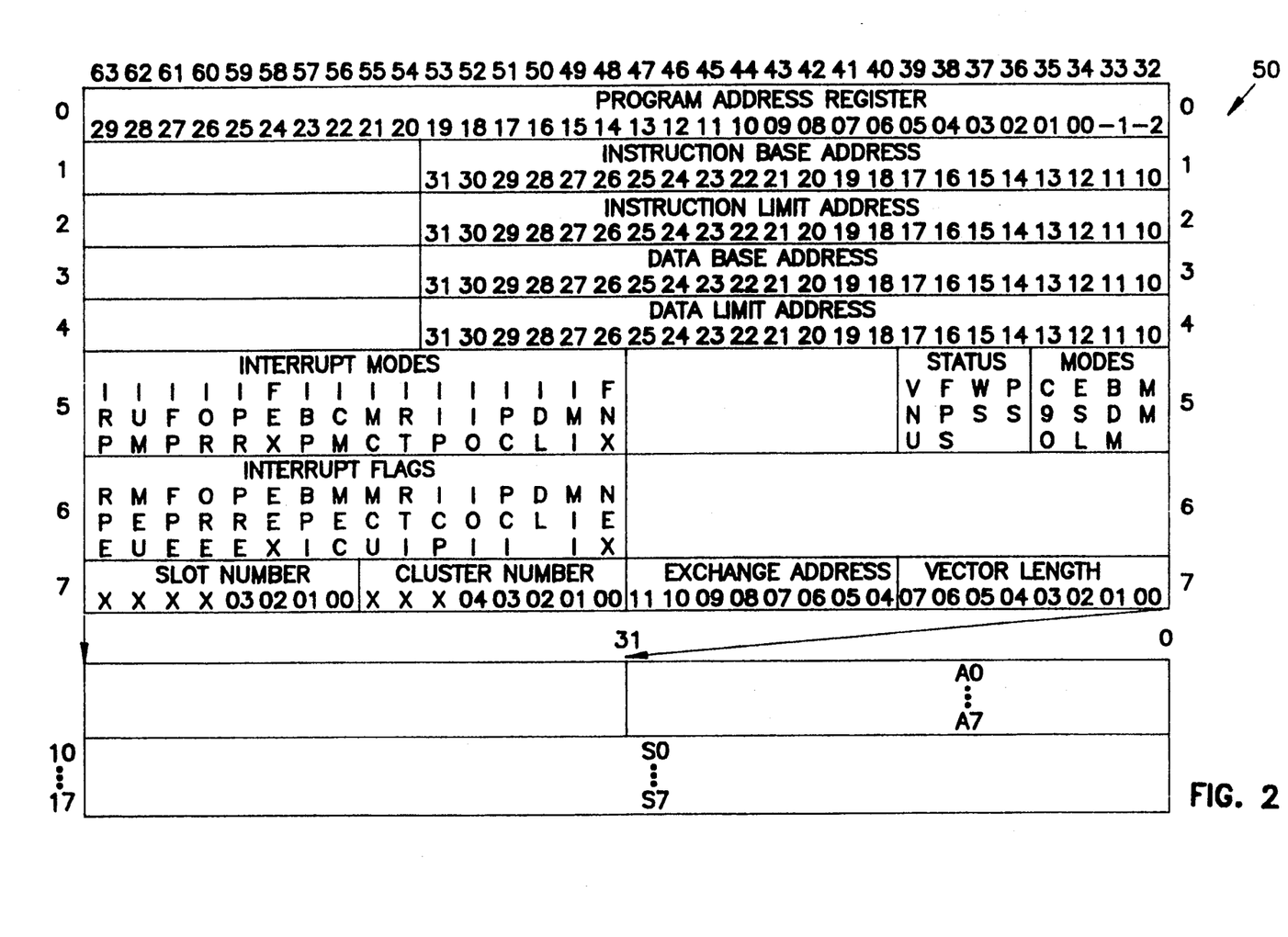
FIG. 2 shows the exchange package used in the vector processing computing system of the present invention.

The preferred embodiment of the exchange package for the present invention is shown in FIG. 2. Exchange package 50 is a 16-word block of data in memory associated with a particular computer program. Exchange package 50 contains the basic parameters necessary to provide continuity when a program stops and restarts from one section of the program to the next. The exchange package also holds the contents of the address (A) and scalar (S) registers. The address and scalar registers, along with the exchange package used in the present invention are described in more detail in U.S. patent application No. 07/618,748 filed Nov. 27, 1990, entitled "Vector Shift By 'Vo Shift Count in Vector Supercomputer Processor", which application is incorporated herein by reference. Table 1 describes the bit assignments for the interrupt modes, flags, status, and mode ("MM"=monitor mode).

TABLE 1

INTERRUPT MODES

TABLE 1-continued

| | |
|---|---|
| IRP | INTERRUPT ON REGISTER PARITY ERROR |
| IUM | INTERRUPT ON UNCORRECTABLE MEMORY ERROR |
| IFP | INTERRUPT ON FLOATING POINT ERROR |
| IOR | INTERRUPT ON OPERAND RANGE ERROR |
| IPR | INTERRUPT ON PROGRAM RANGER ERROR |
| FEX | ENABLE FLAG ON ERROR EXIT (DOES NOT DISABLE EXCHANGE) |
| IBP | INTERRUPT ON BREAKPOINT |
| ICM | INTERRUPT ON CORRECTABLE MEMORY ERROR |
| IMC | INTERRUPT ON MCU INTERRUPT |
| IRT | INTERRUPT ON REAL-TIME INTERRUPT |
| IIP | INTERRUPT ON INTER-PROCESSOR INTERRUPT |
| IIO | INTERRUPT ON I/O |
| IPC | INTERRUPT ON PROGRAMMABLE CLOCK |
| IDL | INTERRUPT ON DEADLOCK |
| IMI | INTERRUPT ON 001 (i,j NOT EQUAL 0) OR 033 INSTRUCTION |
| FNX | ENABLE FLAG ON NORMAL EXIT (DOES NOT DISABLE EXCHANGE) |
| INTERRUPT FLAGS | |
| RPE | REGISTER PARTY ERROR |
| MEU | MEMORY ERROR - UNCORRECTABLE |
| FPE | FLOATING POINT ERROR |
| ORE | OPERAND RANGE ERROR |
| PRE | PROGRAM RANGE ERROR |
| EEX | ERROR EXIT (000 ISSUED) |
| BPI | BREAKPOINT INTERRUPT |
| MEC | MEMORY ERROR - CORRECTABLE |
| MCU | MCU INTERRUPT |
| RTI | REAL-TIME INTERRUPT |
| ICP | INTER-PROCESSOR INTERRUPT |
| IOI | I/O INTERRUPT (IF IIO & SIE) |
| PCI | PROGRAMMABLE CLOCK INTERRUPT |
| DL | DEADLOCK (IF IDL & NOT MM) |
| MII | 001 (i,j NOT EQUAL 0) OR 033 INSTRUCTION INTERRUPT (IF IMI & NOT MM) |
| NEX | NORMAL EXIT (004 ISSUED) |

| STATUS | | MODES | |
|---|---|---|---|
| PS | PROGRAM STATUS | MM | MONITOR MODE |
| WS | WAITING ON SEMAPHORE | BDM | ENABLE BI-DIRECTIONAL MEMORY |
| FPS | VECTORS POINT STATUS | | |
| VNU | VECTORS NOT USED | ESL | ENABLE 2nd VECTOR LOGICAL |
| | | C90 | C90 MODE |

Figure 3A:
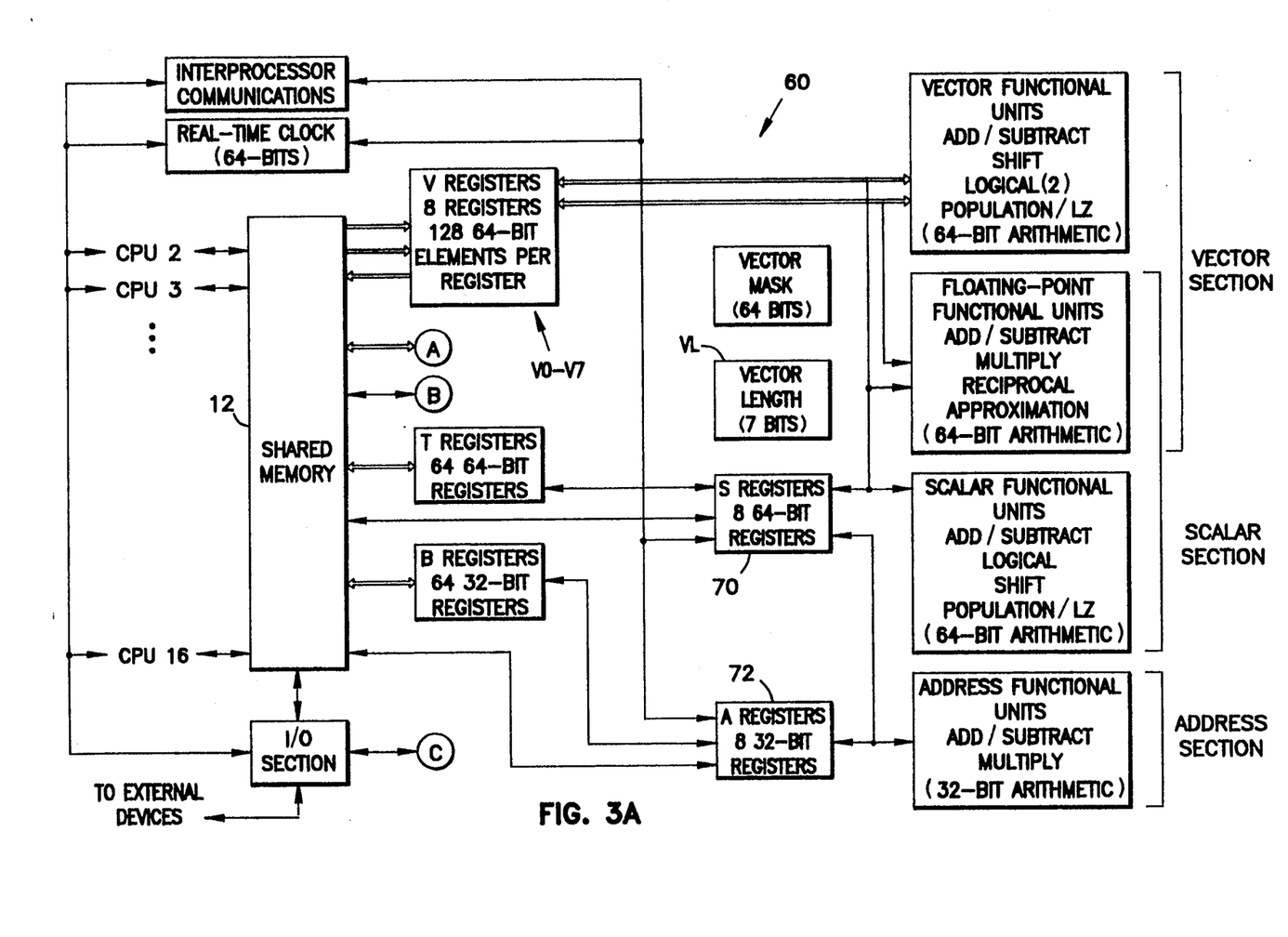
FIGS. 3A and 3B show a simplified block diagram of one embodiment of the vector processor shown in FIG. 1.
Figure 3B:
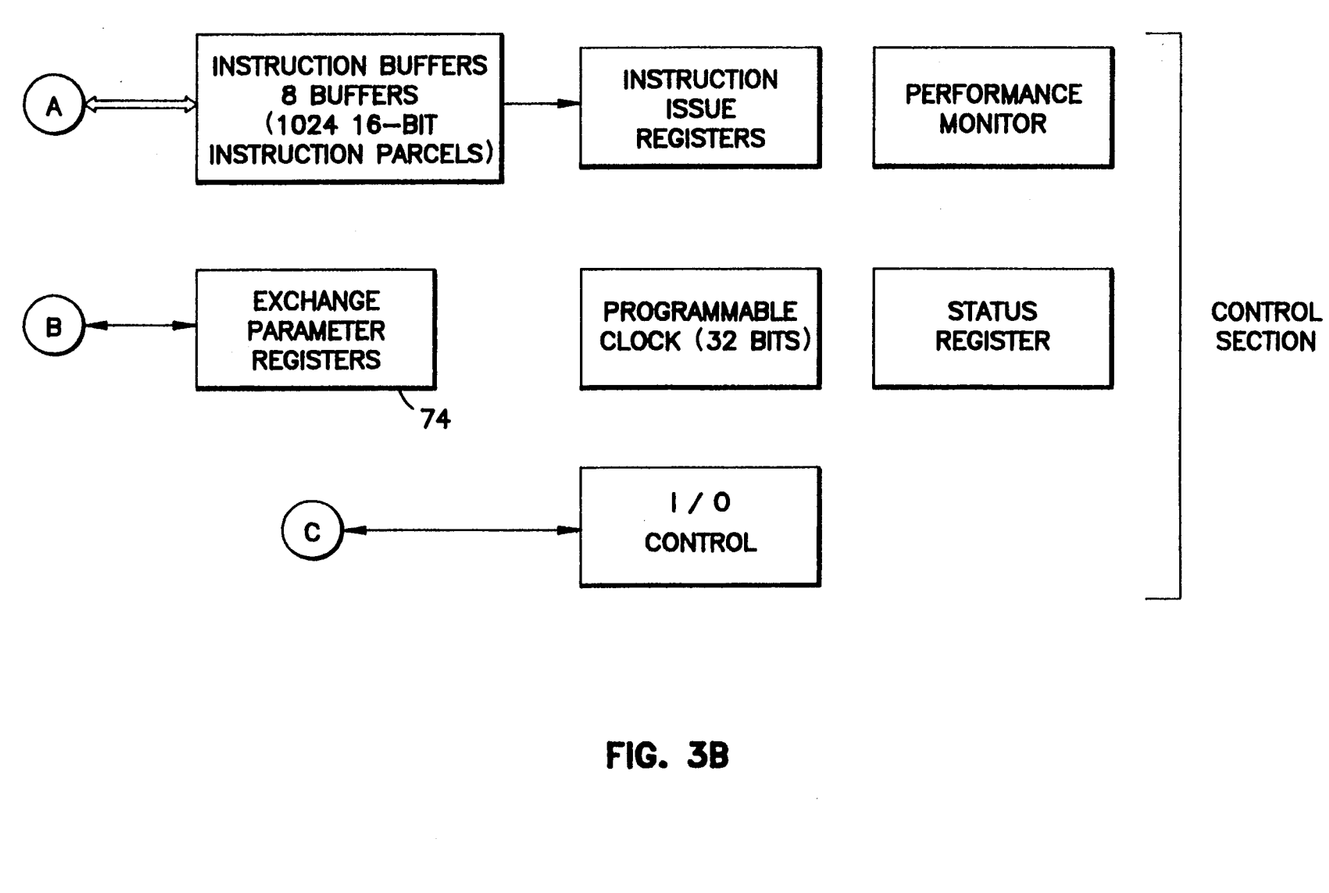

In the preferred embodiment, processor 10 is a vector processor for use in a multiprocessor vector supercomputer. FIGS. 3A and 3B are simplified block diagrams of a vector processor 60. The preferred embodiment is a multiprocessing system with sixteen processors. However it should be obvious that the present invention is independent of the number of processors.

Figure 4A:
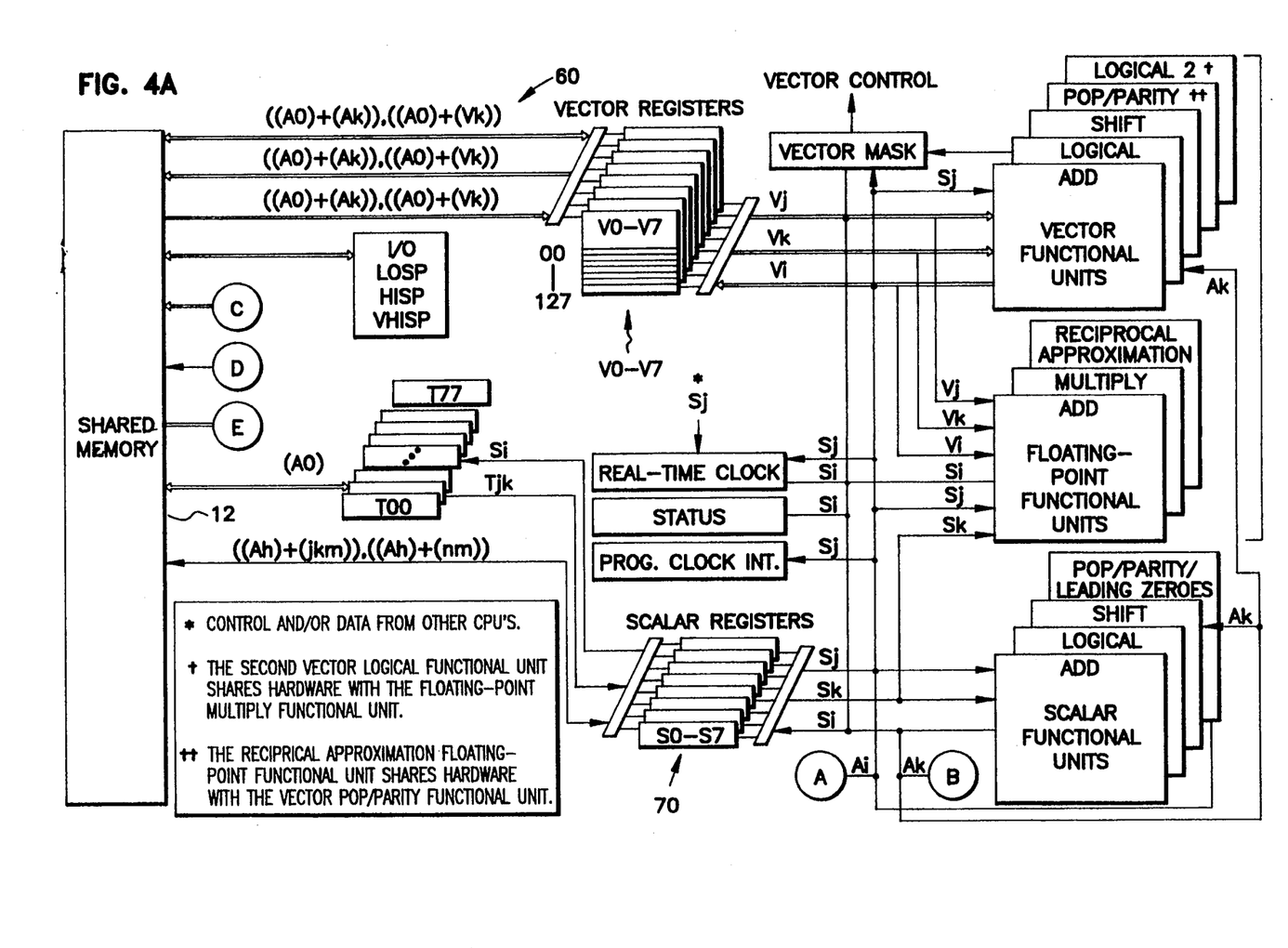
FIGS. 4A and 4B show a more detailed block diagram of one embodiment of the vector processor shown in FIG. 1.
Figure 4B:
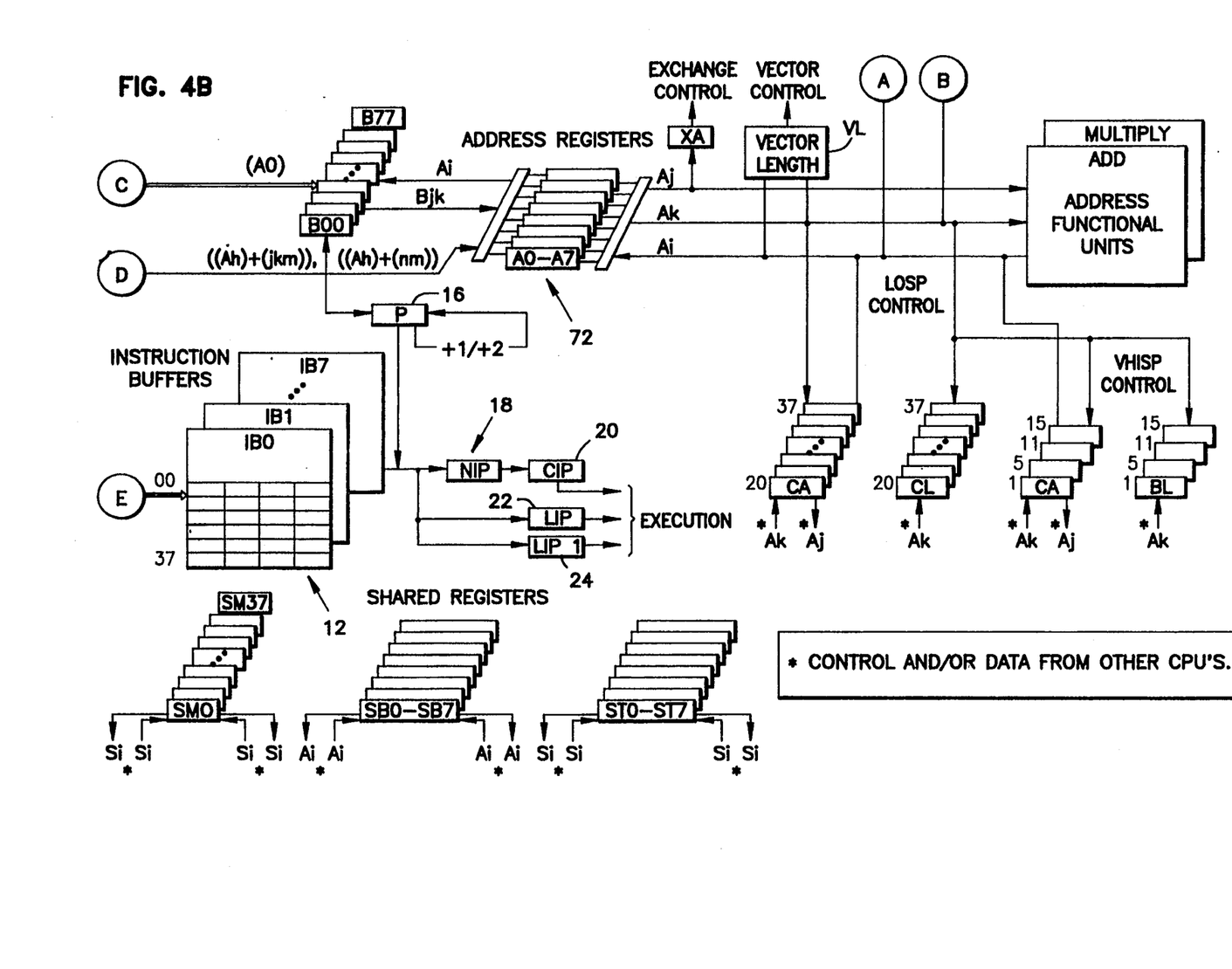

FIGS. 4A and 4B are more detailed block diagrams of the same processor 60. Each processor 60 contains eight vector registers V0-V7. The vector registers V0-V7 each contain 128 words, each word consisting of 64 bits. For example, vector register V0 contains words $V0_0$-$V0_{127}$. The vector registers are interfaced to functional units which perform various logical and arithmetic functions on data from the vector registers. The functional units are fully segmented with latches so that operands can be sent to a functional unit on successive clock periods. Therefore, during the execution of an instruction, each part of a functional unit may be operating on a different operand. Also, each functional unit may operate independent of the other functional units so that more than one result may be obtained from the functional units for each clock period.

When exchange package 50 (as shown in FIG. 2) is transferred from shared memory 12 to a processor 60, exchange package 50 is broken up and the portions are saved in different storage areas of processor 60. Bits 32-63 of words 0-7 are stored in exchange parameter registers 74 (shown in FIG. 3B). Bits 0-31 of words 0-7 are stored in A registers 72 (as shown in FIG. 3A and 4B). Finally, the remaining words 10-17 are stored in S registers 70 (as shown in FIGS. 3A and 4A).

To use the present invention, one would set the privileged instruction mask bit in the exchange package to enable the privileged instruction interrupt. The new operating system software would be loaded in memory and an exchange sequence initiated that starts the new operating system program in user mode. At each occurrence of a privileged instruction in the operating system under test an interrupt would be generated that causes an exchange to the current operating system. Exception handling software would then determine the source of the interrupt and the code to be executed that would provide a state similar to the execution of the privileged instruction. For example, in the preferred embodiment, the instruction used to set up an I/O channel is a privileged instruction. If, in testing the new operating system, it should become necessary to set up an I/O channel, the I/O channel privileged instruction will be issued. This will result in an interrupt and an exchange into monitor mode. Once in monitor mode, the real operating system will, with its knowledge of the current state of the machine, assign an I/O channel by issuing a privileged instruction. The operating system will then clear the interrupt and perform an exchange back into the operating system under test in user mode. Unlike the trace mode, exceptions are encountered rarely so there is little difference in system performance. And, unlike a typical TRAP instruction, traps are performed on code that is an integral part of the final software. The TRAP locations do not have to be rewritten to remove the test points.

Although the present invention has been described with reference to the preferred embodiments, those skilled in the art will recognize that changes may be made in form and detail without departing from the spirit and scope of the invention.

What is claimed is:

1. An apparatus for debugging a new operating system within user mode of a processor having a privileged instruction execution monitor mode wherein privileged instructions are executed and a user mode wherein a privileged instruction is typically treated as a no-operation instruction, the processor comprising an instruction execution unit which executes an instruction parcel having an opcode, the processor further comprising a current instruction parcel register, connected to the instruction execution unit, which receives the instruction parcel before passing the instruction parcel to the instruction execution unit, the apparatus comprising:

processor interrupt means, connected to the current instruction parcel register and the instruction execution unit, for generating a hardware interrupt to said instruction execution unit on encountering a privileged instruction during user mode, wherein the processor interrupt means comprise an interrupt generator which generates the hardware interrupt when the instruction parcel opcode received by the current instruction parcel register is associated with a privileged instruction; and interrupt enable means connected to said processor interrupt means for disabling said hardware interrupt, wherein the interrupt enable means comprise a mode select register connected to the interrupt generator, wherein the mode select register comprises a mode select bit which operates to prevent issuance of the hardware interrupt by the interrupt generator.

2. The apparatus according to claim 1 wherein said interrupt enabling means further comprise means for changing the mode select bit under control of an exchange packet.

3. A method of emulating an operating system having a privileged instruction within user mode of a vector processing computer having both a user mode and a privileged instruction executing monitor mode, comprising the steps of:

providing a processing unit comprising an instruction execution unit, a current instruction register, an interrupt generator and a mode select register comprising a mode select bit having a first and a second logic state;

providing a sequence of instructions, wherein the sequence of instructions includes a first instruction followed by a second instruction and wherein the first instruction is a privileged instruction;

storing the first instruction in the current instruction register;

if the mode select bit is in the first logic state:
generating, from the interrupt generator to the instruction execution unit, a hardware interrupt associated with the privileged instruction;
performing a packet exchange sequence to enter privileged instruction executing mode;
executing, in privileged instruction mode, a series of instructions which emulate execution of the privileged instruction; and
returning to user mode to fetch the second instruction; and otherwise, treating the first instruction as a NO-OP instruction and fetching the second instruction.

4. A method of testing program code for a new operating system in a computer having both a user mode and a privileged instruction executing monitor mode, wherein the program code includes a privileged instruction, the method comprising the steps of:

providing a hardware interrupt circuit for generating a hardware interrupt when the privileged instruction is detected while the computer is in said user mode;

enabling the hardware interrupt circuit;

placing the computer in user mode;

loading the new operating system and executing the new operating system program code within the user mode;

trapping the privileged instruction, wherein the step of trapping the privileged instruction comprises:
detecting the privileged instruction; and
generating the hardware interrupt when the privileged instruction is detected;

switching to the monitor mode; and emulating the privileged instruction.

* * * * *